Ballard & Bond,
Brick Machine.

Nº 84,724.    Patented Dec. 8, 1868.

Witnesses.
Fred. Thomas.
E. R. Beadle.

Inventor.
J. T. Ballard & E. P. Bond
J. W. Beadle, atty.

JACOB H. BALLARD AND EDWARD P. BOND, OF NEW ANTIOCH, OHIO.

Letters Patent No. 84,724, dated December 8, 1868.

IMPROVEMENT IN BRICK-MACHINES.

The Schedule referred to in these Letters Patent and making part of the same.

*To all whom it may concern:*

Be it known that we, JACOB H. BALLARD, and EDWARD P. BOND, of New Antioch, in the county of Clinton, and State of Ohio, have invented new and useful Improvements in Brick-Machines; and we do hereby declare that the following is a full and exact description of the same, reference being had to the accompanying drawings, and to the letters of reference marked thereon.

This invention relates to certain improvements in brick and tile-machines, and consists principally in a novel arrangement of wires in front of the opening, through which the clay is forced by the plungers, by which the clay is cut to the proper size; also, in the general construction and arrangement of the machine; all of which will be fully described hereinafter.

Figure 1:
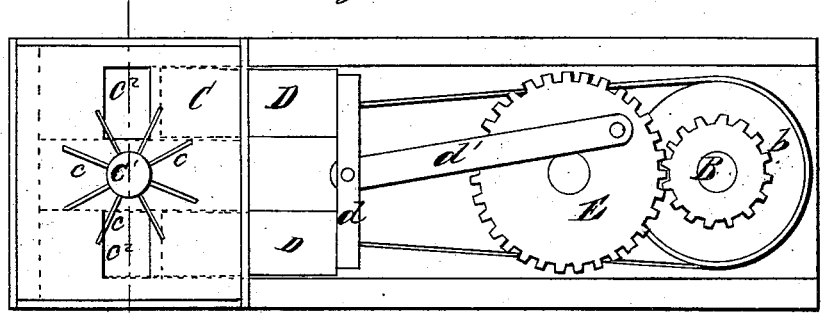
Figure 2:
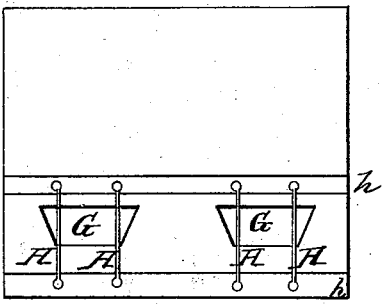

Figure 1 represents a plan view of our improved machine;

Figure 2, an end view; and

Figure 3:
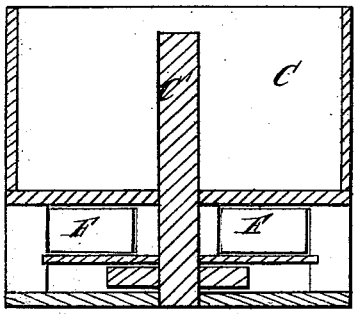

Figure 3, a sectional view, through the line $x$–$y$, fig. 1.

In the drawings—

A represents the frame of the machine, at one end of which is located the shaft B, by which means the power is applied in any suitable way.

Upon the other end of the frame is located the pug-mill C, in which revolves the shaft C', with arms $c$. These arms should be arranged in such manner as to force the clay downward, as well as to thoroughly grind it.

Motion is given to the shaft C' by means of a chain, which passes about the wheel $c^1$, upon its lower end, and also the wheel $b$, of shaft B.

D D represent plungers, which slide upon a bed-plate beneath the pug-mill. These plungers are attached, at the rear ends, to the cross-bar $d$, to which latter is connected the shaft $d'$.

E represents a horizontal wheel, resting upon suitable bearings in frame A, to which motion is communicated from shaft B, in any suitable manner. To wheel E the shaft $d'$ is eccentrically attached.

$c^2$ $c^2$ represent openings in the bottom of the pug-mill, through which the clay passes to the chambers below.

F F represent chambers below the pug-mill, in which the plungers slide.

G G represent openings in chamber F F, through which the clay is pressed by the plungers.

H H represent vertical wires, attached at either end to the projecting pieces $h$ $h$, which wires are arranged in pairs, one being on each side of the openings G G.

The operation of my improved machine is as follows:

Motion having been communicated, in any suitable manner, to the machine, the clay is thrown in the pug-mill, where it is ground, and forced through the openings $c^2$ $c^2$, into the chambers F F. From this point it is forced out through the openings G G, by the action of the plungers D D, which latter receive a reciprocating motion from the wheel E and shaft $d'$.

At the openings G G, the clay is received on rollers, it being forced out in long slabs, and is thus carried away, and is afterward cut into proper lengths by wires. Of course, in passing the wires H H, it is squared to the shape and size desired. By this means perfect corners are made, and the waste falls back upon the tempering-ground.

This machine may be readily used for tile, by removing the brick-die, and putting a tile-die in its place.

By the general construction and arrangement herein described, a simple and effective machine is produced.

Having thus fully described our invention,

What we claim as new, and desire to secure by Letters Patent, is—

The frame A, shaft B, with wheel $b$, pug-mill C, with opening $c^2$, and shaft C', having the wheel $c^1$, plungers D, shaft $d'$, wheel E, chambers F, with openings G and wires H, the whole being combined, arranged, and operated, in the manner described, and for the purposes set forth.

This specification signed and witnessed, this 1st day of May, A. D. 1868.

JACOB H. BALLARD.
EDWARD P. BOND.

Witnesses:
R. E. DOAN,
LEVI MILLS,
D. T. WHITE.